(12) United States Patent
Yousefi et al.

(10) Patent No.: US 11,927,339 B2
(45) Date of Patent: Mar. 12, 2024

(54) ILLUMINATION APPARATUS

(71) Applicant: ams Sensors Asia Pte. Ltd., Singapore (SG)

(72) Inventors: Maryam Yousefi, Eindhoven (NL); Toralf Scharf, Eindhoven (NL); Markus Rossi, Jona (CH)

(73) Assignee: ams Sensors Asia Pte. Ltd., Singapore (SG)

( * ) Notice: Subject to any disclaimer, the term of this patent is extended or adjusted under 35 U.S.C. 154(b) by 0 days.

(21) Appl. No.: 17/606,006

(22) PCT Filed: Apr. 24, 2020

(86) PCT No.: PCT/SG2020/050252
§ 371 (c)(1),
(2) Date: Oct. 22, 2021

(87) PCT Pub. No.: WO2020/222704
PCT Pub. Date: Nov. 5, 2020

(65) Prior Publication Data
US 2022/0205611 A1 Jun. 30, 2022

Related U.S. Application Data

(60) Provisional application No. 62/840,081, filed on Apr. 29, 2019.

(51) Int. Cl.
*F21V 5/00* (2018.01)
*F21V 33/00* (2006.01)
(Continued)

(52) U.S. Cl.
CPC ............ *F21V 5/007* (2013.01); *F21V 5/004* (2013.01); *F21V 33/0052* (2013.01);
(Continued)

(58) Field of Classification Search
CPC ...... F21V 5/007; F21V 5/004; F21V 33/0052; F21Y 2113/20; F21Y 2115/10;
(Continued)

(56) References Cited

U.S. PATENT DOCUMENTS 9,273,846 B1 * 3/2016 Rossi .................. G02B 3/005
10,263,395 B2 * 4/2019 Kim .................... H01S 5/423
(Continued)

FOREIGN PATENT DOCUMENTS

CN 108 132 573 A 6/2018
CN 108 332 082 A 7/2018
(Continued)

OTHER PUBLICATIONS

CN 108332082, Xu, Jul. 2018, English Translation (Year: 2018).*
(Continued)

*Primary Examiner* — Peggy A Neils
(74) *Attorney, Agent, or Firm* — Michael Best & Friedrich LLP

(57) ABSTRACT

An illumination apparatus (1) for producing structured light and flood illumination, the illumination apparatus comprising a microlens array (4) comprising microlenses which are arranged at a pitch P in at least a first direction, and a first array (18) of first light sources (9) and a second array (19) of second light sources (10), the first light sources (9) being configured to emit light at a wavelength L, wherein the first light sources (9) are located at a distance D from the microlens array (4), wherein $P^2=2LD/N$ and N is an integer, and wherein a size of the second light sources (10) is greater than a size of the first light sources (9), such that the light sources of the first array (18) produce structured light and the light sources of the second array (19) produce a continuous area of light.

17 Claims, 8 Drawing Sheets

Figure 1:
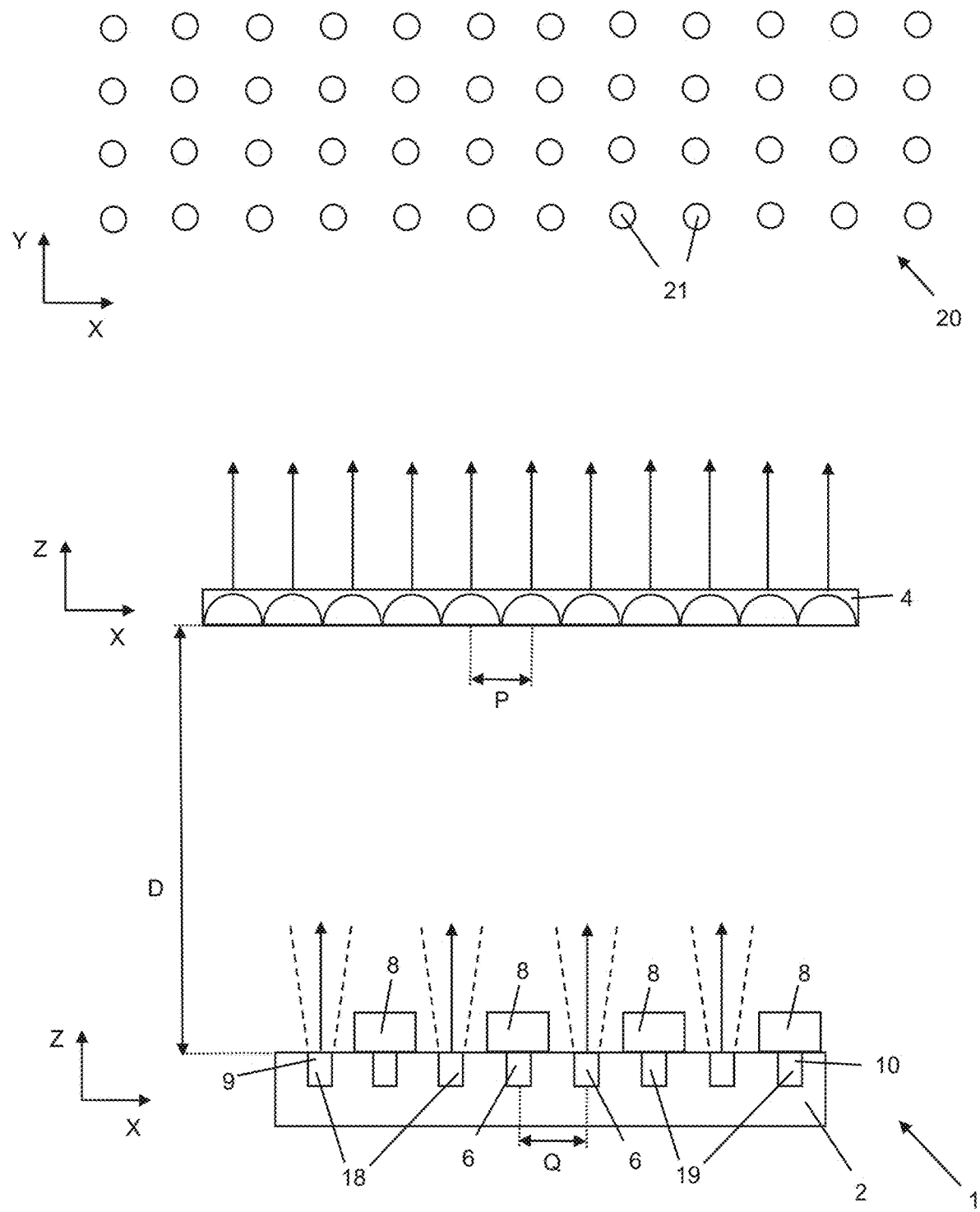

(51) Int. Cl.
*F21Y 113/20* (2016.01)
*F21Y 115/10* (2016.01)
*F21Y 115/30* (2016.01)
*G06V 10/141* (2022.01)
*G06V 40/16* (2022.01)

(52) U.S. Cl.
CPC .......... *G06V 10/141* (2022.01); *G06V 40/166* (2022.01); *F21Y 2113/20* (2016.08); *F21Y 2115/10* (2016.08); *F21Y 2115/30* (2016.08)

(58) Field of Classification Search
CPC .............. F21Y 2115/30; F21Y 2105/10; F21Y 2105/12; F21Y 2113/00; G06V 10/141; G06V 40/166; G02B 3/005
See application file for complete search history.

(56) References Cited

U.S. PATENT DOCUMENTS

| | | | | |
|---|---|---|---|---|
| 11,092,719 | B1 * | 8/2021 | Zhu | ...................... H04N 13/254 |
| 2016/0327235 | A1 * | 11/2016 | Khrushchev | ............ F21V 5/007 |
| 2018/0267214 | A1 | 9/2018 | Rossi et al. | |

FOREIGN PATENT DOCUMENTS

| | | | | |
|---|---|---|---|---|
| CN | 108 337 492 A | 7/2018 | | |
| CN | 109 211 135 A | 1/2019 | | |
| WO | WO-9716679 A1 * | 5/1997 | ............... | F21K 9/23 |
| WO | 2017/131585 A1 | 8/2017 | | |

OTHER PUBLICATIONS

International Search Report with Written Opinion for related Application No. PCT/SG2020/050252 dated Jul. 16, 2020 (8 Pages).
International Preliminary Report on Patentability for related Application No. PCT/SG2020/050252 dated Nov. 11, 2021 (8 Pages).
Jahns et al., "The Lau effect (a diffraction experiment with incoherent illumination)," Optics communications, 1979, 28(3): 263-267.
Kolodziejczyk et al., "Lens-based theory of the Lau effect," Journal of the Optical Society of America A, 2000, 17(4): 724-728.
Som et al., "The generalised Lau effect," Journal of modern optics, 1990, 37(7): 1215-1225.
German Patent Office Action for Application No. 11 2020 002 161.0, dated Mar. 9, 2023 (10 pages, English statement of relevance).

* cited by examiner

ILLUMINATION APPARATUS

TECHNICAL FIELD OF THE DISCLOSURE

The disclosure relates to an apparatus for producing illumination and to an associated method.

BACKGROUND OF THE DISCLOSURE

The present disclosure relates to an apparatus for producing illumination and an associated method. Such an apparatus may be used by a device to determine whether a face is present in a field of vision of the device. The illumination is typically provided by light having an infrared wavelength. The illumination may be a continuous area of illumination, and may be referred to flood illumination. A detector of the device receives reflected light and a processor determines, based on the reflected light, whether a face is present in the field of vision.

If a face is present in the field of vision, then a second apparatus provides structured light. The structured light may comprise an array of dots of light. A detector of the device receives reflections of the dots of light, and the processor uses the reflected light to determine whether the face is the face of an authorized user. If the face is the face of an authorized user then the processor may unlock the device and allow the device to be used. The device may for example be a smartphone.

It may be desirable to provide flood illumination and structured illumination in a manner which has not been disclosed in the prior art.

SUMMARY

In general, this disclosure proposes to use the same apparatus to provide both structured light and flood illumination, instead of using two separate apparatus. This may reduce the complexity and/or cost of the apparatus.

According to a first aspect of the present disclosure, there is provided an illumination apparatus for producing structured light and flood illumination, the illumination apparatus comprising a microlens array comprising microlenses which are arranged at a pitch P in at least a first direction, and a first array of first light sources and a second array of second light sources, the first light sources being configured to emit light at a wavelength L, wherein the first light sources are located at a distance D from the microlens array, wherein $P^2 = 2LD/N$, and N is an integer with N≥1, and wherein a size of the second light sources is greater than a size of the first light sources, such that the light sources of the first array produce structured light and the light sources of the second array produce a continuous area of light.

The disclosure advantageously provides structured light and flood illumination using a single illumination apparatus (e.g. using the same microlens array). This may reduce cost and/or complexity compared with the prior art.

The first array of light sources may have a pitch which is the same as the pitch of the microlens array or is an integer multiple of the pitch of the microlens array.

The second array of light sources may be distributed across locations which are separated by distances which are equal to an integer multiple of the pitch of the microlens array. The integer multiple may be 1.

The second array of light sources may have a pitch which is equal to an integer multiple of the pitch of the microlens array plus half of the pitch of the microlens array.

The first array of light sources may comprise VCSELs.

The VCSELs may have a diameter of 10 microns or less.

The second array of light sources may comprise VCSELs with diffusers placed on top of the VCSELs.

The diffusers may comprise microscopic scattering particles provided in a transmissive material.

The diffusers may have a maximum dimension of 20 microns or more.

The second array of light sources may comprise an array of LEDs.

The array of VCSELs may be provided on a separate substrate to the array of LEDs.

The VCSEL substrate and the LED substrate may be provided adjacent to each other.

The light sources of the second array may have an etendue which is greater than an etendue the light sources of the first array.

The light sources of the second array may have a divergence which is greater than a divergence of the light sources of the first array.

The second array of light sources may comprise VCSELs with lenses placed on top of the VCSELs.

The light sources of the second array of light sources may also be configured to emit light at the wavelength L.

The microlens array may have the lens pitch P in the second direction in addition to the first direction.

According to a second aspect of the present disclosure, there is provided a smartphone, tablet or other consumer electrical device comprising the illumination apparatus of the first aspect.

According to a third aspect of the present disclosure, there is provided an illumination apparatus for producing structured light and flood illumination, the illumination apparatus comprising a microlens array comprising microlenses which are arranged at a pitch P in at least a first direction, and a first array of first light sources and a second array of second light sources, the first light sources being configured to emit light at a wavelength L, wherein the first light sources are located at a distance D from the microlens array, wherein $P^2 = 2LD/N$, and N is an integer with N≥1, and wherein an etendue of the second light sources is greater than an etendue of the first light sources, such that the light sources of the first array produce structured light and the light sources of the second array produce a continuous area of light.

Features of the first and second aspects of the disclosure may be combined with features of the third aspect of the disclosure.

According to a fourth aspect of the disclosure there is provided a method of producing structured light and flood illumination using an apparatus comprising a microlens array comprising microlenses which are arranged at a pitch P in at least a first direction, and a first array of first light sources and a second array of second light sources, the first light sources being configured to emit light at a wavelength L, wherein the first light sources are located at a distance D from the microlens array, wherein $P^2 = 2LD/N$, and N is an integer with N≥1, and wherein a size of the second light sources is greater than a size of the first light sources, the method comprising emitting light from the first array of light sources to form structured light, then emitting light from the second array of light sources to produce a continuous area of light.

BRIEF DESCRIPTION OF THE PREFERRED EMBODIMENTS

Figure 2:
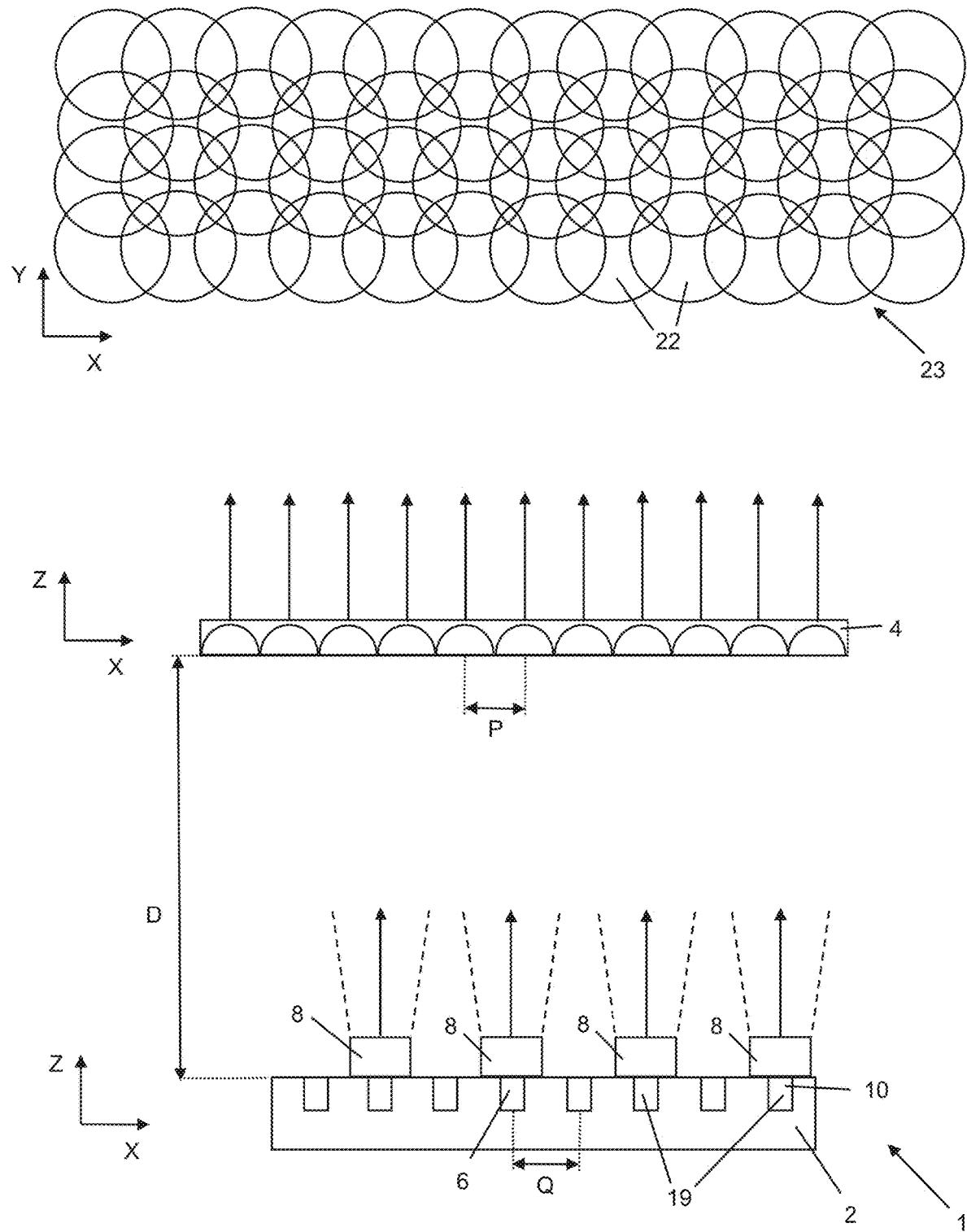
Figure 3:
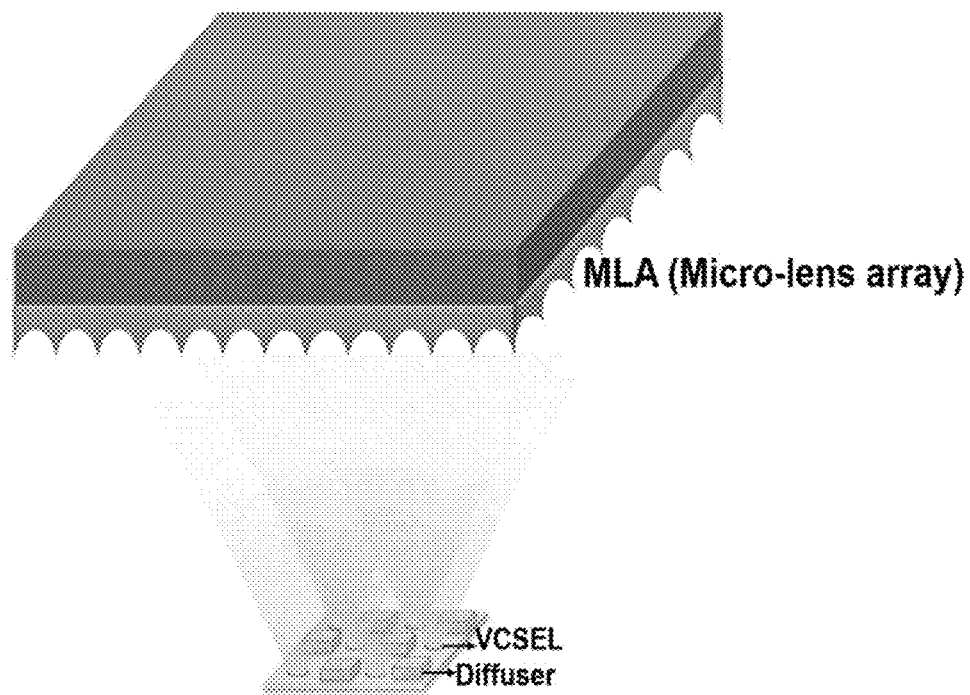
Figure 4:
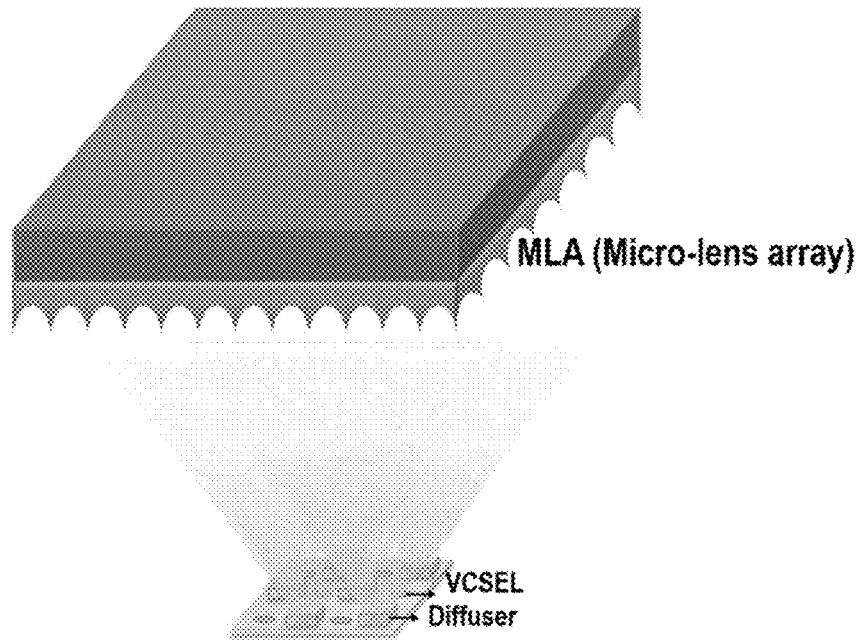
Figure 5:
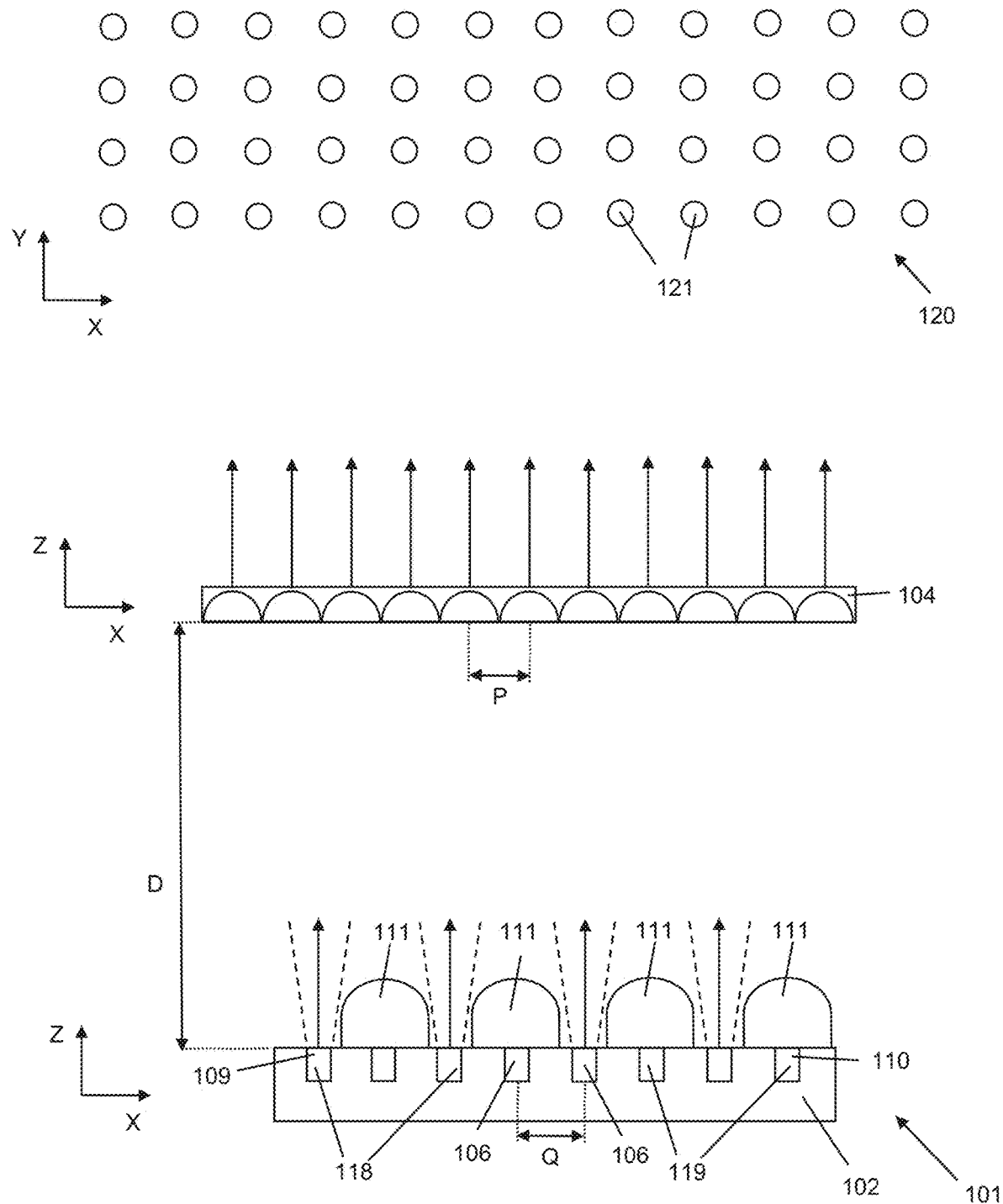
Figure 6:
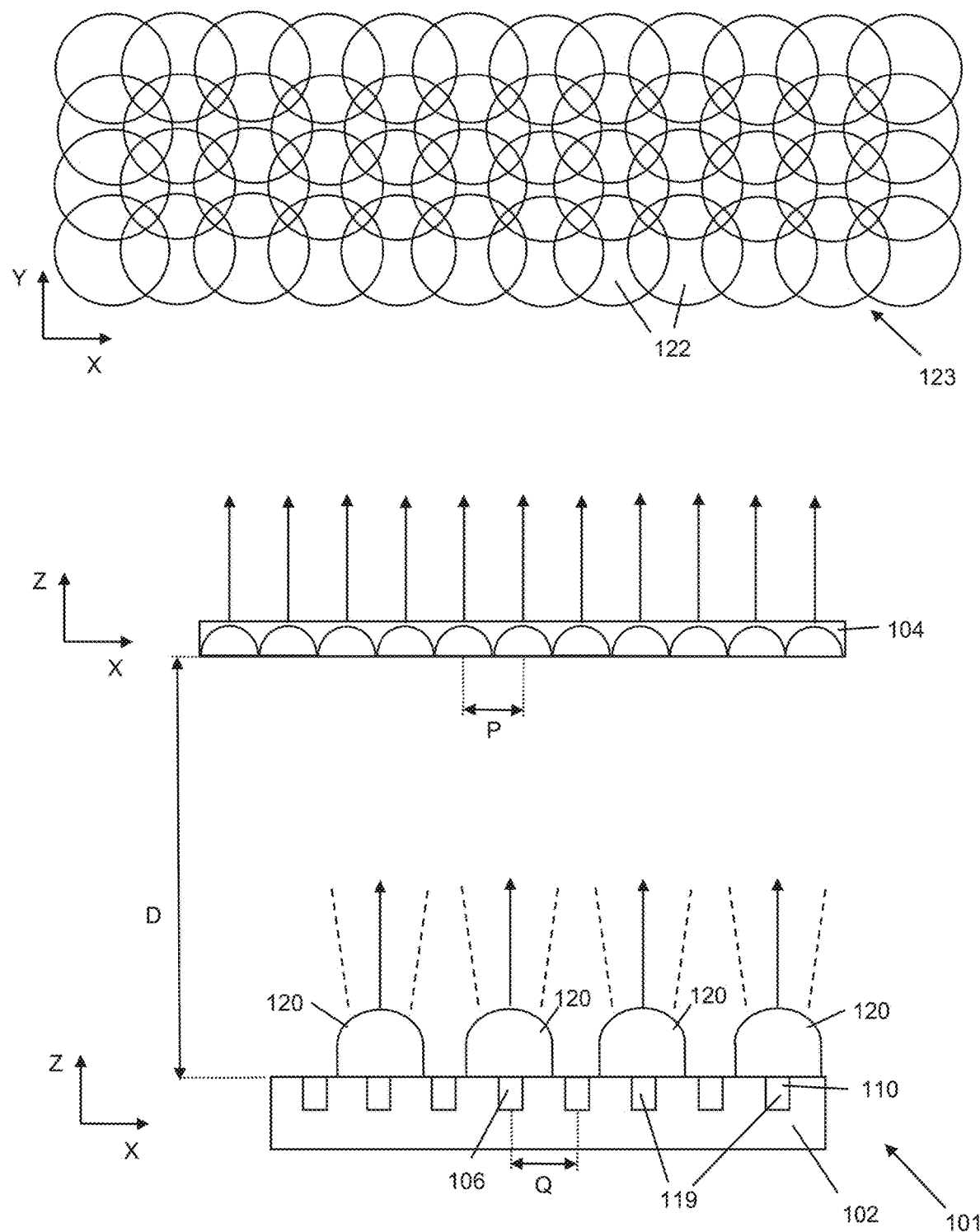
Figure 7:
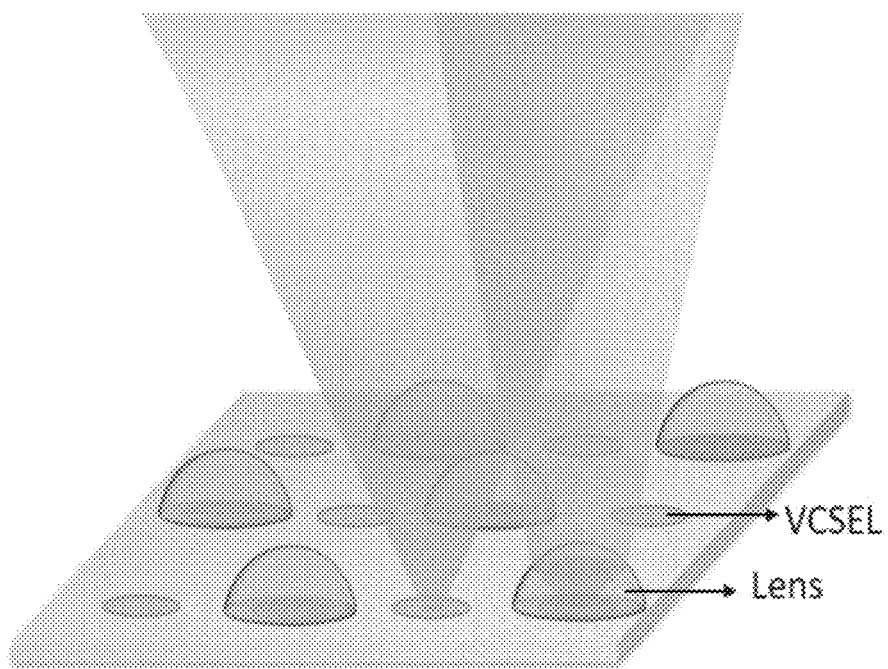
Figure 8:
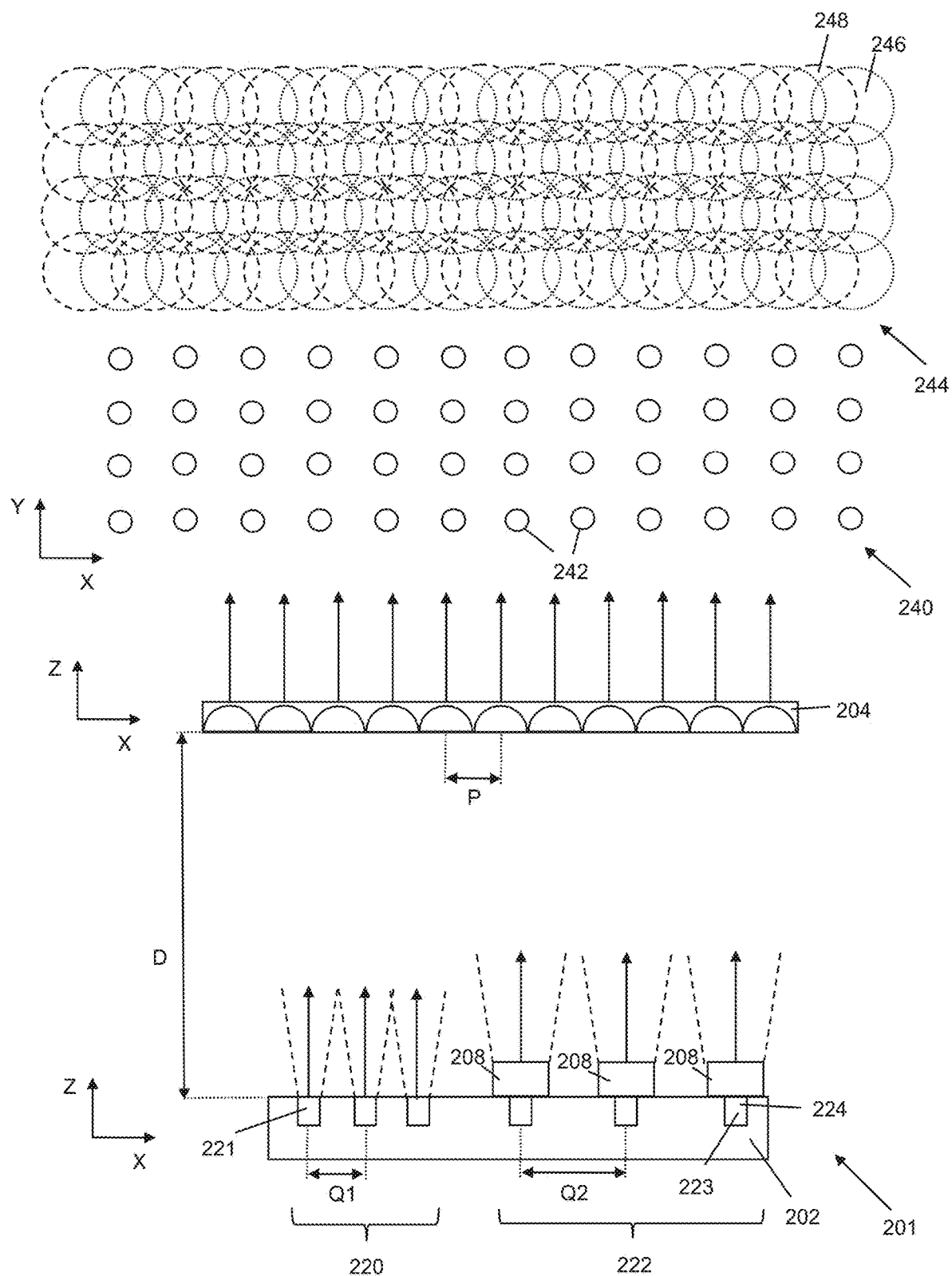
Figure 9:
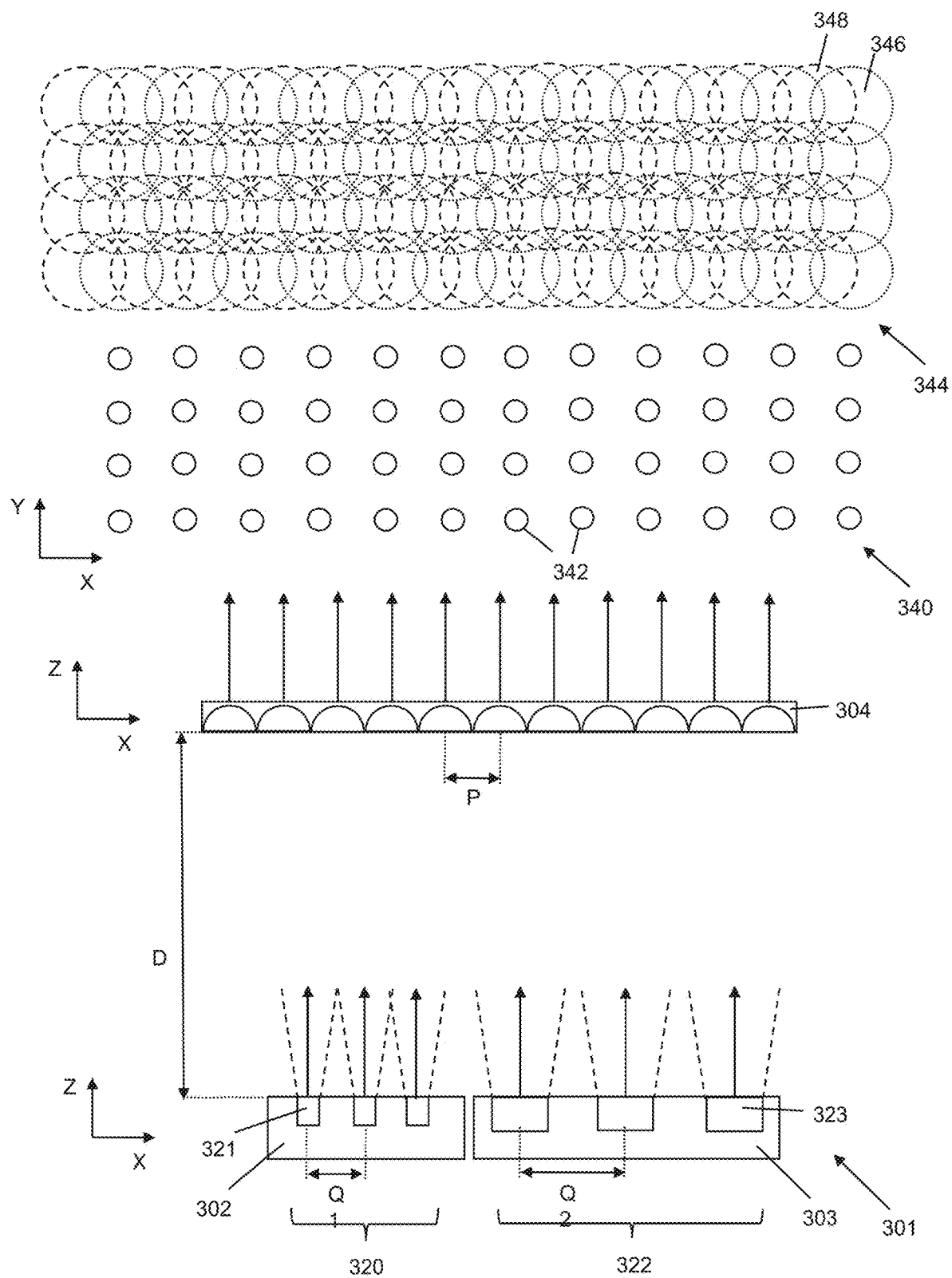

Some embodiments of the disclosure will now be described by way of example only and with reference to the accompanying drawings, in which:

FIG. 1 schematically depicts an illumination apparatus according to a first embodiment of the invention, the illumination apparatus providing structured illumination;

FIG. 2 schematically depicts the illumination apparatus of the first embodiment, but with the illumination apparatus providing flood illumination;

FIG. 3 schematically depicts in perspective view the illumination apparatus of the first embodiment, with the illumination apparatus providing structured illumination;

FIG. 4 schematically depicts in perspective view the illumination apparatus of the first embodiment, with the illumination apparatus providing flood illumination;

FIG. 5 schematically depicts an illumination apparatus according to a second embodiment of the invention, the illumination apparatus providing structured illumination;

FIG. 6 schematically depicts the illumination apparatus of the second embodiment, but with the illumination apparatus providing flood illumination;

FIG. 7 schematically depicts in perspective view the illumination apparatus of the second embodiment;

FIG. 8 schematically depicts an illumination apparatus according to a third embodiment of the invention, the figure depicting both structured illumination and flood illumination provided by the third embodiment; and FIG. 9 schematically depicts an illumination apparatus according to a fourth embodiment of the invention, the figure depicting both structured illumination and flood illumination provided by the fourth embodiment.

DETAILED DESCRIPTION OF THE PREFERRED EMBODIMENTS

Generally speaking, the disclosure provides an illumination apparatus which is configured to provide structured illumination and flood illumination.

Some examples of the solution are given in the accompanying figures.

FIG. 1 schematically depicts an illumination apparatus 1 in accordance with a first embodiment of the invention which is configured to produce structured light and flood illumination The apparatus comprises an array of vertical cavity surface emitting lasers (VCSEL array) 2 and a microlens array 4 spaced apart from the VCSEL array 2. For ease of description, Cartesian coordinates are included on FIG. 1 and some other figures, with x and y being parallel to the emitting surface of the VCSEL array 2. This should not be interpreted as meaning that the VCSEL array must have a particular orientation.

The VCSEL array comprises an array of emitters 6 (only some of which are labeled in order to avoid complicating the figure). The array is a two dimensional array, and may be a rectangular array. The emitters 6 are arranged with a pitch Q (in both the x and y directions in this embodiment). The pitch Q of the emitters may for example be 50 microns. Other pitches may be used. The pitch Q may be 25 microns or more, and may be less than 25 microns (e.g. as little as 10 microns). The pitch Q may be up to 100 microns. The pitch Q may be even bigger, e.g. up to 500 microns, but this might cause the intensity of a structured light pattern formed by the apparatus to be too low. These pitch values may also apply for other embodiments of the invention.

The emitters 6 may be arranged to emit infrared radiation, for example at a wavelength of 940 nm. Other example wavelengths which may be used are 850 nm, 1300 nm and 1500 nm. In general, the infrared radiation may have a wavelength of 800 nm or more. These wavelength values may also apply for other embodiments of the invention.

Diffusers 8 are provided on some of the emitters 6. In this embodiment the diffusers 8 are provided on every second emitter. The diffusers are arranged in a checkerboard arrangement across the two dimensional array of emitters 6. That is, every second emitter 6 is provided with a diffuser 8 along the x-direction, and every second emitter is provided with a diffuser along the y-direction, and diffusers are not provided on consecutive emitters. Other distributions of diffusers may be used. For example, the diffusers may have an irregular arrangement, may be distributed at random (e.g. for half of the emitters), may be provided on every third emitter, etc. The distribution of the diffusers will not have a significant effect upon the far field light provided by the emitters provided with diffusers. Because the diffusers are provided on emitters 6, and the emitters have pitch which is equal to or an integer multiple of the pitch of the microlens array, the diffusers are separated by distances which are equal to integer multiples of the pitch of the microlens array.

An emitter 6 which is not provided with a diffuser 8 may be referred to as a first light source 9 (only one of which is labeled to avoid complicating the figure). Taken together, light sources 9 of this type may be referred to as a first array 18 of first light sources 9. An emitter 6 and diffuser 8 in combination may be referred to as a second light source 10 (and may be referred to as a compound light source 10). Taken together, light sources 10 of this type may be referred to as a second array 19 of second light sources 10.

The microlens array 4 is a two-dimensional array. The microlens array may be a rectangular array. Lenses of the microlens array 4 may be arranged with a pitch P.

The pitch P of the microlenses may for example be 50 microns. Other pitches may be used. The pitch P of the microlenses will determine the angular separation between dots of light which form the structured light. For example, a pitch P of 50 microns will give an angular separation between dots of light of around 1 degree (for a wavelength of light of around 1000 nm). If the pitch P of the microlenses was 100 microns then the angular separation between dots of light would be around 0.5 degrees. A pitch P of microlenses greater than 100 microns may be used, but this would cause the dots of light to be closer together than around 0.5 degrees, and as a result the structured light may not be as useful (the dots may be too close together for some applications). Similarly, if the pitch P of microlenses was 25 microns then the angular separation between dots would be around 2 degrees. A smaller pitch of microlenses may be used, but the dots of light of the structured light may then be too far apart for some applications. These values may be applied for other embodiments of the invention.

The pitch of the emitters Q may be selected to be the same as the pitch P of the microlenses. The pitch Q of the emitters may be an integer multiple of the pitch P of the microlenses. This may also apply for other embodiments of the invention.

The microlens array 4 is separated from the emitting surface of the VCSEL array 2 by a distance D. The distance D is selected such that the following equation is satisfied:

$$P^2 = 2LD/N \qquad \text{(Equation 1)}$$

where L is the wavelength of light emitted by the VCSEL array 2, and N is an integer≥1. As noted above, P is the pitch of the microlenses of the microlens array 4, and D is the distance between the VCSEL array 2 and the microlens array 4. This arrangement is described in U.S. Pat. No. 10,509, 147, the contents of which are hereby incorporated by reference.

Because the distance D has been selected to satisfy equation 1, the apparatus will produce a two-dimensional array 20 of dots 21 of light in the far field when the first array 18 of first light sources 9 is used. The two-dimensional array 20 of dots 21 of light is depicted in the XY plane. If the integer N is selected as 2 then this may advantageously produce particularly good contrast between the dots of light and spaces between the dots (although other integer values may be used). The size of the dots 21 may be determined, at least in part, by the diameter of the VCSELs of the first light sources 9. The VCSELs may for example have a diameter of around 5 microns (e.g. less than 10 microns). This may also apply to other embodiments. Using the first array of light sources 9 to generate the array of dots of light may be referred to as structured light generation (or dot generation). Such an array of structured light is advantageous because reflections of the light from a user's face may be detected by a sensor array and may be used by a processor to determine whether a user is an authorized user of a device such as a smartphone in which the apparatus has been installed.

The diffusers 8 may for example be formed from a transparent material (transparent at an infrared wavelength emitted by the emitters 6) within which microscopic scattering particles are provided. In one example the transparent material may be glass. The diffusers 8 may be formed from milk glass. The effect of the diffusers 8 is to increase the size, and reduce spatial coherence, of the second (compound) light sources 10 which include diffusers (as is schematically illustrated).

The diffusers 8 also reduce slightly the distance between the second light sources 10 and the microlens array 4 (see distance D2). However, the reduction of distance is small compared with the overall distance D and does not have a significant effect upon the distribution of light formed in the far field.

When the second light sources 10, which include diffusers 8, are used, each light source has a significantly larger area than the area of the first light sources 9. The diffusers 8 may for example have a diameter (or maximum dimension) of around 20 microns or more, and may have a diameter (or maximum dimension) of more than 50 microns. The diameter (or maximum dimension) of the diffusers 8 may be greater than the pitch of the VCSELs. The light emitted from the diffusers 8 also has a greater divergence than the light emitted from the VCSELs without diffusers, and is less spatially coherent. The light emitted from the diffusers 8 has a greater etendue than the light emitted from the VCSELs. The light emitted by the second light sources 10 may be such that areas of light 22 formed in the far field by the microlens array 4 overlap with one another. This is schematically depicted in FIG. 2. Such overlapping light areas 22 form a continuous area of light 23. This may be referred to as flood illumination. Flood illumination is advantageous because it illuminates an area which faces a device (the illuminated area may be referred to as a field of vision), and allows easy identification of whether or not a face is within the illuminated area. The presence of a face is determined a processor which monitors reflections of the flood illumination. In one arrangement a device such as a smartphone may use flood illumination to determine whether or not a face is visible, and if a face is visible may then use dot illumination to determine whether the face is a face of an authorized user. Other devices may also use this arrangement.

Embodiments of the invention are advantageous because they provide dot illumination and flood illumination using a single apparatus. This reduces costs compared with using one apparatus to provide flood illumination and using a different apparatus to provide dot illumination.

A schematic perspective view of the apparatus 1 when the first array 18 of first light sources 9 is switched on is depicted in FIG. 3. A schematic perspective view of the apparatus when the second array 19 of second light sources 10 is switched on is depicted in FIG. 4.

An alternative embodiment of the invention is depicted in FIG. 5. Some features of this embodiment correspond with features depicted in FIGS. 1 and 2 and are not described again in detail in connection with this embodiment. An illumination apparatus 101 is depicted which comprises a VCSEL array 102 and a microlens array 104 spaced apart from the VCSEL array. The VCSEL array 102 comprises a two-dimensional array of emitters 106. The array of emitters 106 may be a rectangular array. The emitters 106 may be arranged with a pitch Q. The pitch Q of the emitters 106 may for example be 50 microns. Other pitches may be used, as discussed further above. The emitters 106 may be arranged to emit infra-red radiation for example at a wavelength L of 940 nm. Other wavelengths may be used, as discussed further above.

The microlens array 104 is a two-dimensional array. The microlens array 104 may be a rectangular array. Lenses of the microlens array 104 may be arranged with a pitch P. The microlens array 104 is separated from the emitting surface of the VCSEL array 102 by a distance D, which is selected such that equation 1 is satisfied (e.g. with integer N=2).

Lenses 111 are provided over some of the emitters 106. In this embodiment the lenses are provided on every second emitter 106. The lenses 111 may be arranged in a checkerboard arrangement across the two-dimensional array of emitters or may have some other arrangement (for example as explained further above in relation to diffusers).

The lenses 111 are concave lenses (concave as seen by the emitters 106), and may also be referred to as focusing lenses. The lenses may for example have a diameter of around 20 microns or more, and may have a diameter of more than 50 microns (e.g. 70 microns or more). The diameter of the lenses 111 may be greater than the pitch of the emitters 106 (e.g. VCSELs). The lenses may for example be hemispheres, with a radius of curvature which corresponds to half the diameter of the lenses. The hemispheres may be supported on cylindrical bases. The cylindrical bases may for example have a height which generally corresponds with the radius of curvature of the lenses (e.g. plus or minus 10 microns)

As noted above, the diameter of the lenses 111 may be greater than the pitch Q of the emitters 106. The diameter of the lenses is less than 2×the pitch of the emitters 106 (and is sufficiently small that edges of a lens for a given emitter do not overlap with an adjacent emitter). For example, if the pitch Q of the emitters is 50 microns, then the diameter of the lenses is less than 100 microns.

An emitter 106 which is not provided with a lens 111 may be referred to as a first light source 109. Taken together, light sources 109 of this type may be referred to as a first array 118 of first light sources. An emitter 106 and lens 111 in combination may be referred to as a second light source 110 (and may be referred to as a compound light source 110). Taken together, light sources 110 of this type may be referred to as a second array 119 of second light sources.

When the first light sources 109 emit light an array 120 of dots of light 121 is formed in the far field by the microlens array 104.

FIG. 6 depicts the situation when the second light sources 110 emit light. The lenses 111 of the second light sources 110 act to increase the size of the second light sources. At the same time, the angular distribution of light from the light source is reduced. Because the second light sources 110 are larger, areas of light 122 formed in the far field by the microlens array 104 are also larger. As a result, the areas of light 122 may overlap with one another when the second light sources emit light. They form a continuous area of light 123. As noted above, such overlapping light may provide a continuous area of light (this may be referred to as flood illumination).

A disadvantage of this embodiment is that the spatial coherence of the light which passes through the lenses is not reduced (as is the case when diffusers are used), and the divergence of the light is reduced. As a result, in some instances interference may cause unwanted patterning in the far field.

FIG. 7 is a schematic perspective view which depicts the apparatus of FIG. 5 emitting light from both the first array 118 of light sources 109 and the second array 119 of light sources 110.

FIG. 8 schematically depicts in cross section a further alternative embodiment of the invention. In this embodiment an illumination apparatus 201 comprises a VCSEL array 202 and a microlens array 204. The VCSEL array 202 comprises a first array 220 of emitters 221 and a second array 222 of emitters 223. Both of the arrays 220, 222 are two-dimensional arrays. The arrays 220, 222 may be rectangular arrays. In this embodiment the first array of VCSEL emitters 220 has a pitch Q1 of 50 microns and the second array of emitters 222 has a pitch Q2 of 75 microns. The first and second arrays 220, 222 are both provided as part of the same VCSEL array. The first and second arrays 220, 222 may be located adjacent to each other. An array 240 of dots of light 242 and a continuous area of light 244 formed from overlapping areas of light 246 are both depicted in FIG. 8. These are separated from one another in the Y-direction but aligned with one another in the X-direction, in order to allow comparison between their arrangements (in practice the array of light 240 and the continuous area of light 244 would occupy the same area).

As with other embodiments, the microlens array 204 has a pitch P. In this embodiment the pitch P may be 50 microns. The separation between the surface of the VCSEL array 202 and the microlens array 204 is a distance D. As with other embodiments the distance D is selected such that equation 1 is satisfied (e.g. with integer N=2).

Diffusers 208 are provided on emitters 223 of the second array 222. An emitter 223 and diffuser 208 in combination may be referred to as a second light source 224 (and may be referred to as a compound light source). Taken together, light sources 224 of this type may be referred to as second light sources 224 of the second array 222. Emitters 221 of the first array 220 are not provided with diffusers, and may be referred to as first light sources 221. Taken together, light sources 221 of this type may be referred to as first light sources 221 of the first array 220.

As with the embodiment described in connection with FIGS. 1-4, the diffusers 208 act to increase the size of the second (compound) light sources 224 (and reduce spatial coherence). The diffusers also increase divergence and etendue of the light. When the second light sources 224 emit light, larger areas of light are formed (compared with dots of light which are formed by the first array of first light sources 221).

The pitch Q2 of the second light sources 224 is selected such that additional areas of light are formed in the far field (compared with the number of dots of light formed in the far field when the first light sources 221 emit light). In this embodiment the pitch Q2 is 1½ times the pitch P of the microlens array 204.

In order to understand the effect of the pitch of the light sources it is useful to first consider the effect of a single light source. If a single light source 221 of the first array 220 emits light, the microlens array 204 will form a two dimensional array of dots of lights. The angular separation of the dots of light will be determined by the pitch P of the microlens array 204 and the wavelength of the light emitted by the light source 221. For example, if the pitch P is 50 microns and the wavelength is 940 nm, then the angular separation between the dots will be around 1 degree. If another light source 225 of the first array 220 emits light, then this will also form a two dimensional array 240 of dots of light 242. If the separation (pitch Q1) between the light sources is equal to pitch P of the microlens array 204 (i.e. 50 microns) then two dimensional array of dots of lights will directly overlay the two dimensional array of dots of light formed by the first light source (provided that a line between the two light sources 221 is parallel to a grid of the microlens array 204). Thus, the spatial arrangement of the two dimensional array of dots of light is unchanged, but the intensity of the dots increases. In the embodiment of FIG. 8 the pitch Q1 of the first light sources 221 are provided in a two dimensional array with a pitch Q1 which corresponds with the pitch P of the microlenses (and which has the same grid orientation as the grid of the microlenses). When the first array of first light sources 221 emits light this forms a two dimensional array of dots of light in the far field which have an angular separation of around 1 degree. As noted further above, the first light sources 221 may have pitch Q1 which is an integer multiple of the pitch P of the microlens array. Where this is the case, the two dimensional arrays of dots of light that are formed will overlay each other, but the intensity of dots of light will be reduced (there are less first light sources 221).

If a single light source 224 of the second array 222 emits light, the microlens array 206 will form a two dimensional array of areas of light in the far field. These areas 246, which are depicted by dotted lines in FIG. 8, may overlap with one another. When an adjacent (in the x-direction) light source 224 of the second array emits light, another two dimensional array of areas of light is formed in the far field. These areas 248, which are depicted by dashed lines in FIG. 8, may overlap with one another. This array of light areas 248 is spatially shifted in the x direction by half of the pitch of the array of light areas. As a result, the two arrays of light areas taken together have half the pitch in the x-direction of the array of light areas formed by a single light source 224.

The pitch of the arrays of light in the y-direction is not halved when the two light sources 224 adjacent in the x-direction emit light. However, when an adjacent light source 224 in the y-direction emits light, another two dimensional array of areas of light is formed in the far field, which is spatially shifted in the y direction by half of the pitch. This is not depicted in FIG. 8 in order to avoid over complicating the figure.

In general, the pitch of the dots of light (or areas of light) is determined by the ratio of the pitch of the light sources 221, 224 relative to the pitch of the microlens array 204 (and by the wavelength of the light). When $Q1/P=1$ (or some other integer), the pitch of the dots of light is determined by the pitch of the microlens array P and the wavelength of the light (according to the diffraction equation). If $Q2/P=\frac{1}{2}$ then the pitch of the light areas is halved (compared with the pitch of the dots). If $Q2/P=3/2$ then the pitch of the pattern will be multiplied by (3/2), but multiple patterns will be formed which are shifted relative to each other. The multiple shifted patterns added together provide a resulting pattern which is the same as a pattern would be formed if the pitch of the light sources 224 was $Q2/P=\frac{1}{2}$. An arrangement of this type may be used because it may be easier to provide light sources 224 with a pitch $Q2/P=3/2$ than with a pitch $Q2/P=\frac{1}{2}$. As an example, it may be easier to provide light sources 224 with a pitch of 75 microns than with a pitch of 25 microns (for a 50 micron pitch microlens array).

Other pitches may be used (as explained further above in connection with other embodiments).

The pitch of the second light sources 224 is thus selected such that the array of light areas formed in the far field has half of the pitch of the array of light dots formed by the first light sources 221. This advantageously increases overlap between the light areas, such that the flood illumination provided by the second light sources 224 is more evenly distributed. This approach may be used with other embodiments of the invention.

FIG. 9 schematically depicts in cross section a further alternative embodiment of the invention. In this embodiment an illumination apparatus 301 comprises a VCSEL array 302, an LED array 303 and a microlens array 304. The VCSEL array 302 comprises a first array 320 of emitters 321, and the LED array comprises a second array 322 of emitters 323. The emitters 321, 323 are examples of light sources. Both of the arrays 320, 322 are two-dimensional arrays. The arrays 320, 322 may be rectangular arrays, and may be located adjacent to each other. The VCSEL array 302 and the LED array 303 may be formed on different substrates (they may be formed from different types of semiconductor). The VCSEL array 302 and the LED array may be provided adjacent to each other. In this embodiment the first array 320 of VCSEL emitters 321 has a pitch Q1 of 50 microns and the second array 322 of LED emitters 323 has a pitch Q2 of 75 microns. Other pitches may be used (as explained further above in connection with other embodiments).

As with other embodiments, the microlens array 304 has a pitch P. In this embodiment the pitch P may be 50 microns. The separation between the surface of the VCSEL array 302 and LED array 322 and the microlens array 304 is a distance D. As with other embodiments the distance D is selected such that equation 1 is satisfied (e.g. with integer $N=2$).

The size of the LEDs 323 may be greater than the VCSEL emitters 321. The LEDs 8 may for example have a diameter (or maximum dimension) of around 20 microns or more, and may have a diameter (or maximum dimension) of more than 50 microns. In addition, the LEDs 323 emit light with a lower spatial coherence and a larger divergence than light emitted by the VCSELs 321. The LEDs may have a greater etendue than the VCSELs. When the LEDs 323 emit light, larger areas of light are formed (compared with dots of light which are formed by when the VCSEL emitters 321 emit light).

The pitch Q2 of the LED emitters 323 may be selected such that additional areas of light are formed in the far field (compared with the number of dots of light formed in the far field when the VCSEL emitters 321 emit light). In this embodiment the pitch Q2 is 3/2 times the pitch P of the microlens array 304. Other pitches such as 5/2 times, 7/2 times, etc. the pitch P of the microlens array may be used. In general, the pitch of the LED emitters may be equal to an integer multiple of the pitch of the microlens array plus half of the pitch of the microlens array. This may also apply to the second array of light sources for other embodiments of the invention. The pitch of the LED emitters 323 may be different in the x and y directions.

As with FIG. 8, an array 340 of dots of light 342 and a continuous area of light 344 formed from overlapping areas of light 346, 348 are both depicted in FIG. 9. These are separated from one another in the Y-direction but aligned with one another in the X-direction, in order to allow comparison between their arrangements (in practice the arrays of light 340, 344 would occupy the same area).

As depicted in FIG. 9, dots of light 342 which are separated from one another are formed when the VCSEL emitters 323 emit light. When the LED emitters 321 emit light, overlapping areas of light 346, 348 are formed, which together form a continuous area of light. As with FIG. 8, some of the overlapping areas of light in the Y-direction are not depicted in order to avoid over complicating the figure.

In above described embodiments of the invention each array of emitters is a rectangular array, with the same pitch in the x and y directions. However, in other embodiments, the pitch in the x-direction may differ from the pitch in the y-direction.

Emitters of embodiments of the invention may be configured to emit infrared radiation, for example at a wavelength of 940 nm (or other infrared wavelengths as explained further above). Emitting infrared radiation is advantageous because it is not seen by the user. Although other non-visible wavelengths of radiation could be used such as ultraviolet radiation, this is less desirable because significantly more power is required to emit ultraviolet radiation (it is desirable in devices such as smartphones to minimise power usage in order to extend battery life).

In the depicted embodiments only a small number of light sources is shown (e.g. 6, 8 or 12 light sources). In practice, many more light sources may be provided. For example, 100 or more, 1000 or more, 5000 or more, or 10,000 or more light sources may be provided. Similarly, although only a small number of microlenses are depicted in the microlens array, a larger number of microlenses may be provided. For example, 100 or more, 1000 or more, 5000 or more, or 10,000 or more microlenses may be provided.

The microlenses may be transparent refractive semi-concave microlenses. The microlenses may alternatively be concave microlenses or convex microlenses. Alternatively, the microlenses may be diffractive microlenses or defective and refractive microlenses (which may be referred to as hybrid microlenses). The microlenses may be reflective microlenses.

Embodiments of the present disclosure may further comprise a processor and may further comprise a memory. A smartphone, tablet device, or other consumer electrical device may comprise an apparatus according to an embodiment of the disclosure.

The term "continuous area of light" may be understood to mean an area of light which comprises individual areas of light that overlap with each other. In some embodiments the continuous area of light may have no dark areas (i.e. areas that receive no light), although there may be some variation in the intensity of light at different locations in the continuous area of light.

In the above described embodiments, the light sources of the first and second arrays emit light with the same wavelength. In other embodiments, the light sources of the second array may emit light with a different wavelength (e.g. a different infrared wavelength). However, a sensor array used to detect light emitted by the first and second arrays of light source may include a filter which is designed to transmit a particular wavelength of light. For this reason, it may be preferable for the first and second arrays to emit light with the same wavelength.

LIST OF REFERENCE NUMERALS:

1 Illumination apparatus
2 VCSEL array
4 Microlens array
6 Emitters
8 Diffusers
9 First light source
10 Second light source
18 First array of light sources
19 Second array of light sources
20 Array of dots of light
21 Dots of light
22 Areas of light
23 Continuous area of light
101 Illumination apparatus
102 VCSEL array
104 Microlens array
106 Emitters
109 First light source
111 Lenses
110 Second light source
118 First array of first light sources
119 Second array of second light sources
120 Array of dots of light
121 Dots of light
122 Areas of light
123 Continuous area of light
201 Illumination apparatus
202 VCSEL array
204 Microlens array
208 Diffusers
220 First array of emitters
221 Emitters (first light sources) of the first array
222 Second array of emitters
223 Emitters of second array
224 Second light sources of the second array
225 First light sources of the first array
240 Array of dots of light
242 Dots of light
244 Continuous area of light
246 Areas of light
301 Illumination apparatus
302 VCSEL array
303 LED array
304 Microlens array
320 First array of emitters
321 Emitters of the first array
322 Second array of emitters
340 Array of dots of light
342 Dots of light
344 Continuous area of light
346 Areas of light
348 Additional areas of light The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. An illumination apparatus for producing structured light and flood illumination, the illumination apparatus comprising:
a microlens array comprising microlenses which are arranged at a pitch P in at least a first direction; and
a first array of first light sources and a second array of second light sources, the first light sources being configured to emit light at a wavelength L, wherein the first light sources are located at a distance D from the microlens array, wherein $P^2 = 2LD/N$, and N is an integer with $N \geq 1$;
wherein the second light sources include emitters with diffusers located on the second light sources;
wherein the first light sources are emitters without diffusers located on the emitters; and
wherein the diffusers provide the second light sources with a physical size which is greater than a physical size of the first light sources, such that the light sources of the second array have an etendue greater than an etendue of the light sources of the first array,
wherein the light sources of the first array produce structured light and the light sources of the second array produce a continuous area of light.

2. The illumination apparatus of claim 1, wherein first array of light sources has a pitch which is the same as the pitch of the microlens array or is an integer multiple of the pitch of the microlens array.

3. The illumination apparatus of claim 1, wherein the second array of light sources is distributed across locations which are separated by distances which are equal to an integer multiple of the pitch of the microlens array.

4. The illumination apparatus of claim 1, wherein the second array of light sources has a pitch which is equal to an integer multiple of the pitch of the microlens array plus half of the pitch of the microlens array.

5. The illumination apparatus of claim 1, wherein the first array of light sources comprises VCSELs.

6. The illumination apparatus of claim 5, wherein the VCSELs have a diameter of 10 microns or less.

7. The illumination apparatus of claim 6, wherein the diffusers comprise microscopic scattering particles provided in a transmissive material.

8. The illumination apparatus of claim 1, wherein the diffusers have a maximum dimension of 20 microns or more.

9. The illumination apparatus of claim 1, wherein the second array of light sources comprises an array of LEDs.

10. The illumination apparatus of claim 9, wherein the first array of light sources includes VCSELs, forming an array of VCSELs, and wherein the array of VCSELs is provided on a separate substrate to the array of LEDs.

11. The illumination apparatus of claim 10, wherein the VCSEL substrate and the LED substrate are provided adjacent to each other.

12. The illumination apparatus of claim 1, wherein the light sources of the second array have a divergence which is greater than a divergence of the light sources of the first array.

13. The illumination apparatus of claim 1, wherein the light sources of the second array of light sources are also configured to emit light at the wavelength L.

14. The illumination apparatus of claim 1, wherein the diffusers are provided in a checkerboard arrangement.

15. A smartphone, tablet or other consumer electrical device comprising the illumination apparatus of claim 1.

16. An apparatus for producing structured light and flood illumination, the illumination apparatus comprising:
- a microlens array including microlenses arranged at a pitch P in at least a first direction;
- a first array of first light sources; and
- a second array of second light sources, the first light sources configured to emit light at a wavelength L, wherein the first light sources are located at a distance D from the microlens array, wherein $P^2 = 2LD/N$, and N is an integer with $N \geq 1$, and
wherein the second light sources include emitters with lenses located thereon,
wherein the first light sources are emitters without lenses located thereon,
wherein the lenses provide the second light sources with a physical size greater than a physical size of the first light sources, such that the light sources of the second array have an etendue greater than an etendue of the light sources of the first array,
wherein the light sources of the first array produce structured light, and
wherein the light sources of the second array produce a continuous area of light.

17. An illumination apparatus for producing structured light and flood illumination, the illumination apparatus comprising:
- a microlens array including microlenses arranged at a pitch P in at least a first direction;
- a first two-dimensional rectangular array of first light sources, the first light sources including VCSELs; and
- a second two-dimensional rectangular array of second light sources, the second light sources including LEDs;
- wherein the first light sources are configured to emit light at a wavelength L,
- wherein the first light sources are located at a distance D from the microlens array,
- wherein $P^2 = 2LD/N$, and N is an integer with $N \geq 1$;
wherein the light sources of the first two-dimensional rectangular array produce structured light and the light sources of the second two-dimensional rectangular array produce a continuous area of light.

* * * * *